United States Patent Office 2,863,435
Patented Dec. 9, 1958

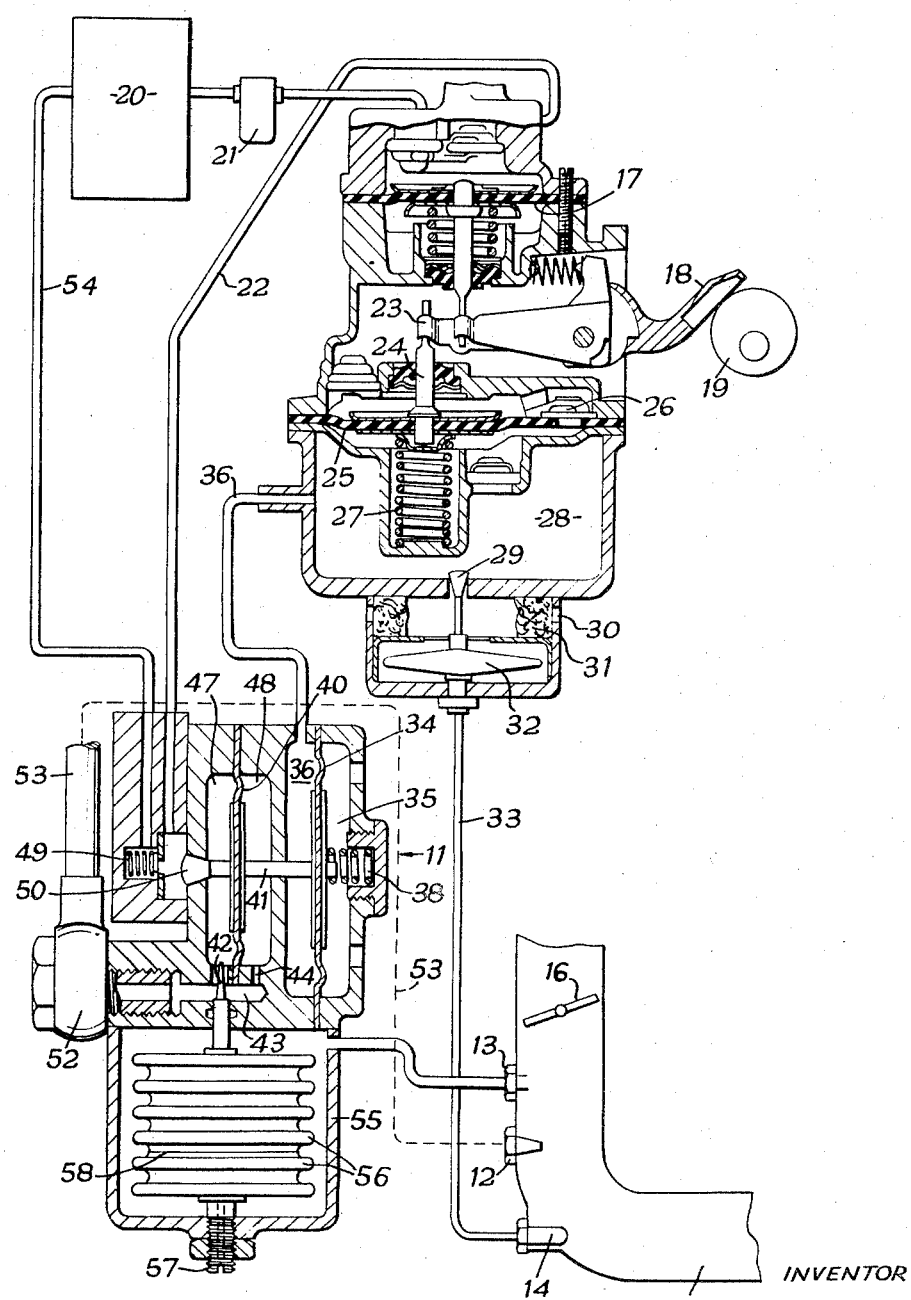

---

2,863,435

FUEL SUPPLY SYSTEMS FOR ENGINES

Richard Henry Syson, Milton, Ontario, Canada, assignor to Engineering Research and Application Limited, a corporation of Great Britain Application May 1, 1956, Serial No. 581,920

7 Claims. (Cl. 123—119)

This invention relates to fuel supply systems for engines in which the fuel is injected continuously into an induction tract feeding a number of cylinders of, for example, a spark ignition two or four stroke internal combustion engine. The rate of fuel injection is required to be varied with the weight of air inducted per unit time into the working cylinders of the engine. The weight of air inducted per unit time by the engine depends directly on the engine R. P. M., on the density of the charge passing into the cylinder, and on the exhaust back pressure from the cylinders. This may be expressed as:

$$Q \propto N \frac{(P_M - KP_B)}{T_M}$$

where:

Q is weight of air inducted per unit time
N is engine R. P. M.
$P_M$ is mean absolute pressure in the induction tract
K a constant
$P_B$ is mean exhaust back pressure
$T_M$ is absolute temperature of the charge in the induction tract.

For a constant fuel/air ratio the rate of fuel injection must be directly proportional to the weight of air inducted. Therefore we have for constant fuel/air ratio:

$$R_F \propto N \frac{(P_M - KP_B)}{T_M}$$

where $R_F$ is rate of fuel injection.

The main object of the invention is to provide improved means for controlling the fuel supply in accordance with engine speed, induction tract temperature, absolute pressure and exhaust back pressure. In particular, it is desired to avoid the necessity for close machined tolerances to be maintained in production as for example is involved in a fuel metering pump. It is further desired to make use as far as possible only of parts already well known in cheap mass production. A further object of the invention is to provide a construction which can be applied to existing designs of engines without provision of additional driving means, flanges or the like.

According to the invention we provide a device for controlling the supply of fuel from a pump to the induction tract of an engine wherein the fuel supply is controlled in accordance with a variable air pressure which, relative to atmospheric pressure, varies approximately in proportion to the square of the engine speed.

In a constructional form of the invention fuel is supplied through two valves, the first of which is controlled by a first movable wall, the opposite sides of which are under pressures corresponding respectively to the inlet and outlet sides of the second valve and said first valve is connected to a second movable wall, one side of which is exposed to atmospheric pressure and the other side of which is at any pressure below atmospheric pressure, the second valve being connected to a device which controls the second valve so as to move it towards its opening position with increasing manifold pressure and to move it towards its closing position with increasing exhaust back pressure and conversely.

An embodiment of the invention will now be described by way of example with reference to the accompanying diagrammatic drawing which shows a lay out of an apparatus made in accordance with the invention partly in section.

The apparatus consists of three main units, viz:

(1) A fuel and vacuum pump assembly 10.
(2) A fuel metering assembly 11.
(3) A fuel injector unit 12.

Two minor units consists of pressure and temperature connections 13, 14, to the induction tract 15.

The pump and metering assemblies 10, 11 may have a common mounting to the engine for ease of installation and would normally be mounted in the same position and on the same flange as the commonly known mechanical fuel pump feed for the normal type of carburettor installation. The injector unit will take the place in the induction tract of the usual carburettor assembly though the actual fuel injection may take place down stream of the butterfly throttle 16.

A normal fuel pump 17 is operated by the normal type of lever 18 and engine driven eccentric 19 and draws fuel from a tank 20 through a filter 21 and expels it through a pipe 22. The lever 18 actuates an additional arm 23, stem 24, and diaphragm 25 of a vacuum pump having usual valves such as 26 and return spring 27. This pump evacuates air from a vacuum bell 28 situated immediately below the diaphragm unit.

Air is allowed to enter this vacuum bell through a jet controlled by a tapered needle valve 29. This jet draws its air from the atmosphere through a hole 30, filter 31 and silencer unit. The rate of air flow through this jet is proportional to the square root of the pressure difference across it, i. e. is proportional to the square root of the pressure difference between atmosphere and the vacuum bell. Since the displacement of the vacuum pump diaphragm is constant the volume of air pumped by it is directly proportional to engine R. P. M. Therefore, we have a pressure in the vacuum bell which varies as the square of the engine R. P. M. This may be expressed as:

$$P_A - P_3 \propto N^2$$

where $P_A$ is the absolute atmosphere pressure, $P_3$ is the absolute pressure in the vacuum bell.

The needle valve 29 is attached to a capsule 32 the interior of which is connected by a pipe 33 to the temperature bulb 14 in the manifold.

The vacuum bell 28 is in communication by pipe 37 with one side 36 of a movable wall device having a diaphragm 34. The other side 35 of diaphragm 34 is open to atmosphere and is loaded by a spring 38. The diaphragm 34 is connected to the diaphragm 40 of a second movable wall device by a stem 41.

Fuel is supplied to one side 47 of this device from pipe 22, past a spring loaded blow-off valve 49 and a jet controlled by a needle valve 50. Diaphragm 40 is exposed on its opposite sides to the differential pressure across a fuel jet which is controlled by a second tapered needle valve 42. The outflow from this jet enters a duct 43 connected at 44 to the other side 48 of the diaphragm 40 and is connected by a connector 52 and pipe 53 to the injector 12. The blow-off valve is connected by pipe 54 to the tank 20.

The pressure differential across 42 is proportional to the square of the rate of fuel flow through the metering jet 42. This may be expressed as:

$$R_F \propto \sqrt{P_1 - P_2}$$

where $P_1$ is the absolute fuel pressure on the upstream side of the metering jets and $P_2$ is the absolute fuel pressure on the downstream side of the jet.

The depression generated in the vacuum bell and communicated to side 36 of diaphragm 34 forces the needle valve 50 towards the open position with a force equal to $(P_A-P_3)A$, where A is the effective diaphragm area of diaphragm 34. The opening of the needle valve allows the supply pressure $P_S$ to be communicated to the metering jet 42, and increasing the flow through this jet until such time as the pressure differential across it and diaphragm 40 equalises the load produced by diaphragm 34, i. e. until $(P_1-P_2)B$ equals $(P_A-P_3)A$ at which time the needle is in equilibrium where B is the effective area of diaphragm 40.

We have already seen that the depression in the vacuum bell is proportional to $N^2$ therefore, with the needle valve 50 in equilibrium the pressure differential across diaphragm 40 is also proportional to $N^2$. This pressure differential then produces a flow through the meter jet 42 proportional to the square root of $N^2$, i. e. to N the engine R. P. M. i. e.

$$(P_A-P_3) \propto N^2 \propto (P_1-P_2)$$

$$R_F \propto \sqrt{P_1 - P_2}$$

therefore $$R_F \propto N$$

The fuel pressure $P_2$ is regulated by the blow off pressure of the injector unit into the inlet manifold, the injector unit having a spring loaded closure for this purpose. The only limitation on the supply pressure $P_S$ is that it should be greater than the fuel pressure $P_1$ which it is supplying past the needle valve 50. $P_1$ is itself determined by its pressure differential relative to $P_2$ required to force the fuel through the metering jet 42 to meet the maximum engine demand and pressure $P_2$ is determined as already stated by the delivery pressure at the injector.

The pressure tapping 13 is taken from the inlet tract 15 and communicated to a chamber 55 containing a pressure capsule 56 which regulates the position of the metering needle 42. This pressure capsule is in two sections on opposite sides of a wall 58, the larger one being a sealed unit and the smaller having its internal capacity connected to an exhaust back pressure tapping 57. In this way, increase in the manifold pressure $P_N$ causes the capsule to collapse and withdraw the main metering needle 42, thus increasing the rate of fuel flow through the jet.

In addition, an increase in exhaust back pressure $P_B$ when communicated to the inside of the small section of the capsule, causes this section to expand and thus closes the metering needle 42 towards its seat. The relative sizes and stiffness to the two parts of the capsule 56 determine the relative effects of the manifold pressure $P_M$ and the exhaust back pressure $P_B$. The form of the main metering needle 42 is such that it controls the rate of fuel flow through the jet to give the required relationship, i. e. so that the rate of fuel flow should be directly proportional to the absolute pressure in the induction tract 15 minus a proportion of the exhaust back pressure.

The form of the needle 29 is such as to give the required relationship in the rate of fuel flow, i. e. that the rate of fuel flow should be inversely proportional to the absolute temperature of the charge. The temperature needle control is arranged so that an increase in manifold charge temperature opens the needle valve in the jet and reduces the depression on the vacuum bell. This decrease in depression reduces the rate of fuel flow by the mechanism already described under control by engine R. P. M.

During engine idling the various pressure differences are too small to successfully operate the metering system. An adjustable spring stop is therefore fitted on the speed control diaphragm system so that the fuel flow past the fuel control needle can be set to suit idling conditions. Enrichment for cold starting can also be achieved by adjusting this stop.

The invention retains the advantages claimed for pressure carburation over the normal suction operated type with gravity fuel feed, viz:

(1) The rate of fuel delivered is insensitive to pressure pulses existing in the induction tract due to the operation of the pistons and inlet valves, as the device depends on much larger pressure differences.

(2) Fuel delivery can be made at more than one position to aid equal fuel distribution to all cylinders in a multi-cylinder engine.

(3) Operation of the system is not dependent on the placing of a restriction such as venturi choke in the air intake system.

(4) The fuel delivery may be made on the engine side of the butterfly air control valve.

(5) The system automatically gives correction for changes in atmospheric conditions, i. e. changes in the air intake temperature and barometric pressure.

I claim:

1. A device for controlling the supply of fuel to the induction tract of an engine comprising a fuel pump, a valve for controlling flow of fuel from the pump to the engine, a movable device for actuating said valve, an air chamber independent from the air supply to the engine, an air pump controlling the pressure of air in said chamber, a cam member driven by the engine, means for driving both the fuel pump and the air pump from said cam member, and means for applying the pressure in said chamber to said device.

2. A device for controlling the supply of fuel to the induction tract of an engine comprising a fuel pump, a valve for controlling flow of fuel from the pump to the engine, a movable device for actuating said valve an air chamber having an air inlet, thereto, an air pump evacuating air from said chamber, a cam driven by the engine, means for driving both the fuel pump and the air pump from said cam, and means for connecting said chamber to said device so as to influence the movement of said device according to the pressure in said chamber.

3. A device for controlling supply of fuel to an engine comprising a fuel pump, a first valve disposer between the fuel pump outlet and the engine, a second valve a first movable wall connected to said first valve, the opposite sides of which wall are under pressures of the fuel corresponding respectively to the inlet and outlet sides of a second valve; a second movable wall also connected to said first valve, one side of which is exposed to atmospheric pressure, a reduced air pressure chamber connected to the other side of said second wall; an arrangement which is connected to the second valve and controls the second valve so as to move it towards its opening position with increasing manifold pressure; an air pump evacuating said chamber, a cam member driven by the engine and means for operating both the fuel pump and the air pump from said cam.

4. A device as claimed in claim 2 wherein the pressure of air within the chamber is affected by a flow of air through a needle valve which is operated according to variations of temperature within the induction tract.

5. A device as claimed in claim 1 wherein the vacuum pump is operated by an arm which is actuated simultaneously with another arm which operates the fuel pump, both arms being actuated by a cam follower and cam, said cam being rotated by the engine.

6. A device as claimed in claim 1 wherein the fuel is supplied to the induction tract at a position between a butterfly air control valve, disposed within the tract, and the engine.

7. A device as claimed in claim 6 wherein the needle valve is connected to a capsule disposed in a chamber beneath the vacuum pump, said capsule expanding with rise in temperature and so opening the needle valve.

References Cited in the file of this patent

UNITED STATES PATENTS 1,288,420    Jay _____ Dec. 17, 1918